(12) United States Patent
Hwang et al.

(10) Patent No.: US 9,329,102 B2
(45) Date of Patent: May 3, 2016

(54) OPTICAL MONITORING SYSTEM FOR A GAS TURBINE ENGINE

(71) Applicant: General Electric Company, Schenectady, NY (US)

(72) Inventors: Wontae Hwang, Clifton Park, NY (US); William Albert Challener, Glenville, NY (US); Jason Harris Karp, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 519 days.

(21) Appl. No.: 13/925,476

(22) Filed: Jun. 24, 2013

(65) Prior Publication Data

US 2014/0376590 A1 Dec. 25, 2014

(51) Int. Cl.
*G01M 15/14* (2006.01)

(52) U.S. Cl.
CPC .......... *G01M 15/14* (2013.01); *Y10T 29/49826* (2015.01)

(58) Field of Classification Search
CPC .................. G01M 15/14; Y10T 29/49826
See application file for complete search history.

(56) References Cited

U.S. PATENT DOCUMENTS

| | | | |
|---|---|---|---|
| 4,711,524 A | 12/1987 | Morey et al. | |
| 5,381,229 A | 1/1995 | Murphy et al. | |
| 6,796,709 B2 | 9/2004 | Choi | |
| 7,486,864 B2 | 2/2009 | Diatzikis | |
| 7,662,091 B2 | 2/2010 | Bagley et al. | |
| 8,184,151 B2 | 5/2012 | Zombo et al. | |
| 2004/0007668 A1 | 1/2004 | Barlian et al. | |
| 2008/0245980 A1 | 10/2008 | Diatzikis | |
| 2008/0310804 A1 | 12/2008 | Brummel et al. | |
| 2009/0225320 A1 | 9/2009 | Bendall et al. | |
| 2009/0234555 A1* | 9/2009 | Williams | F23N 1/002 701/100 |
| 2010/0074727 A1* | 3/2010 | Twerdochlib | G01H 1/006 415/118 |
| 2010/0076703 A1* | 3/2010 | Twerdochlib | G01H 1/006 702/56 |
| 2010/0220182 A1 | 9/2010 | Krull et al. | |
| 2011/0069165 A1 | 3/2011 | Zombo et al. | |
| 2012/0098940 A1 | 4/2012 | Zombo et al. | |
| 2012/0140234 A1 | 6/2012 | Masterson et al. | |
| 2013/0115050 A1* | 5/2013 | Twerdochlib | F01D 21/14 415/118 |
| 2013/0235391 A1* | 9/2013 | Baleine | G01B 11/14 356/625 |
| 2013/0247576 A1* | 9/2013 | Myhre | F23N 5/08 60/772 |
| 2013/0318942 A1* | 12/2013 | Kraemer | F23R 3/46 60/39.091 |
| 2014/0060619 A1* | 3/2014 | Feist | G01N 21/6408 136/246 |
| 2014/0376589 A1* | 12/2014 | Karp | G01M 15/14 374/130 |

* cited by examiner

*Primary Examiner* — Mark R Gaworecki
(74) *Attorney, Agent, or Firm* — Ann M. Agosti

(57) ABSTRACT

A system for optically monitoring a gas turbine engine includes a viewport having an opening disposed within a casing of the gas turbine engine. The opening extends from an interior side of the casing to an exterior side of the casing, and the viewport is configured to receive an image from inside the casing. The system also includes an optical connection positioned outside the casing and optically coupled to the viewport. The optical connection is configured to convey the image from the viewport to a detector array, and the optical connection includes multiple optical fibers fused to one another to form a unitary substantially rigid fiber bundle.

20 Claims, 6 Drawing Sheets

OPTICAL MONITORING SYSTEM FOR A GAS TURBINE ENGINE

BACKGROUND

The subject matter disclosed herein relates to an optical monitoring system for a gas turbine engine.

Certain gas turbine engines include a turbine and/or a combustor having viewports configured to facilitate monitoring of various components within the turbine and/or the combustor. For example, a pyrometry system may receive radiation signals through the viewports to measure a temperature of certain components within a hot gas path of the gas turbine engine. The pyrometry system may include multiple sensors, each optically coupled to a corresponding viewport and configured to measure the intensity of radiation emitted by the turbine components and/or the combustor components. For example, certain sensors (e.g., optical sensors) are configured to provide a line-of-sight point temperature measurement or an average temperature measurement of each monitored component.

Utilizing an infrared camera having a two-dimensional detector array may provide additional information regarding the performance of each monitored component, such as thermal stress within the component. However, it may be undesirable to position an infrared camera proximate to a viewport due to the heat and vibration generated by the gas turbine engine. For example, if the infrared camera is positioned proximate to the viewport, a cooling system may be employed to maintain the temperature of the infrared camera within a desirable range. Unfortunately, utilizing a cooling system may substantially increase the cost and complexity associated within monitoring the gas turbine engine. Furthermore, if a flexible optical fiber is employed to convey an image from the viewport to a remote camera, a similar cooling system may be employed to maintain the temperature of the flexible optical fiber within a desired range. Similar to the infrared camera cooling system, the optical fiber cooling system may substantially increase the cost and complexity of the monitoring system.

BRIEF DESCRIPTION

In one embodiment, a system for optically monitoring a gas turbine engine includes a viewport having an opening disposed within a casing of the gas turbine engine. The opening extends from an interior side of the casing to an exterior side of the casing, and the viewport is configured to receive an image from inside the casing. The system also includes an optical connection positioned outside the casing and optically coupled to the viewport. The optical connection is configured to convey the image from the viewport to a detector array, and the optical connection includes multiple optical fibers fused to one another to form a unitary substantially rigid fiber bundle.

In another embodiment, a system for optically monitoring a gas turbine engine includes a viewport having an opening disposed within a casing of the gas turbine engine. The opening extends from an interior side of the casing to an exterior side of the casing, and the viewport is configured to receive an image from inside the casing while the gas turbine engine is in operation. The system also includes an optical connection positioned outside the casing and optically coupled to the viewport. The optical connection is configured to receive the image from the viewport, and the optical connection includes multiple optical fibers fused to one another to form a unitary substantially rigid fiber bundle. In addition, the system includes a detector array in optical communication with the optical connection. The detector array is configured to receive the image from the optical connection and to output signals indicative of a two-dimensional intensity map of the image.

In a further embodiment, a method of manufacturing an optical monitoring system for a gas turbine engine includes optically coupling an optical connection to a viewport having an opening disposed within a casing of the gas turbine engine. The opening extends from an interior side of the casing to an exterior side of the casing, the viewport is configured to receive an image from inside the casing, the optical connection is positioned outside the casing, the optical connection is configured to convey the image from the viewport to a detector array, and the optical connection includes multiple optical fibers fused to one another to form a unitary substantially rigid fiber bundle.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Figure 1:
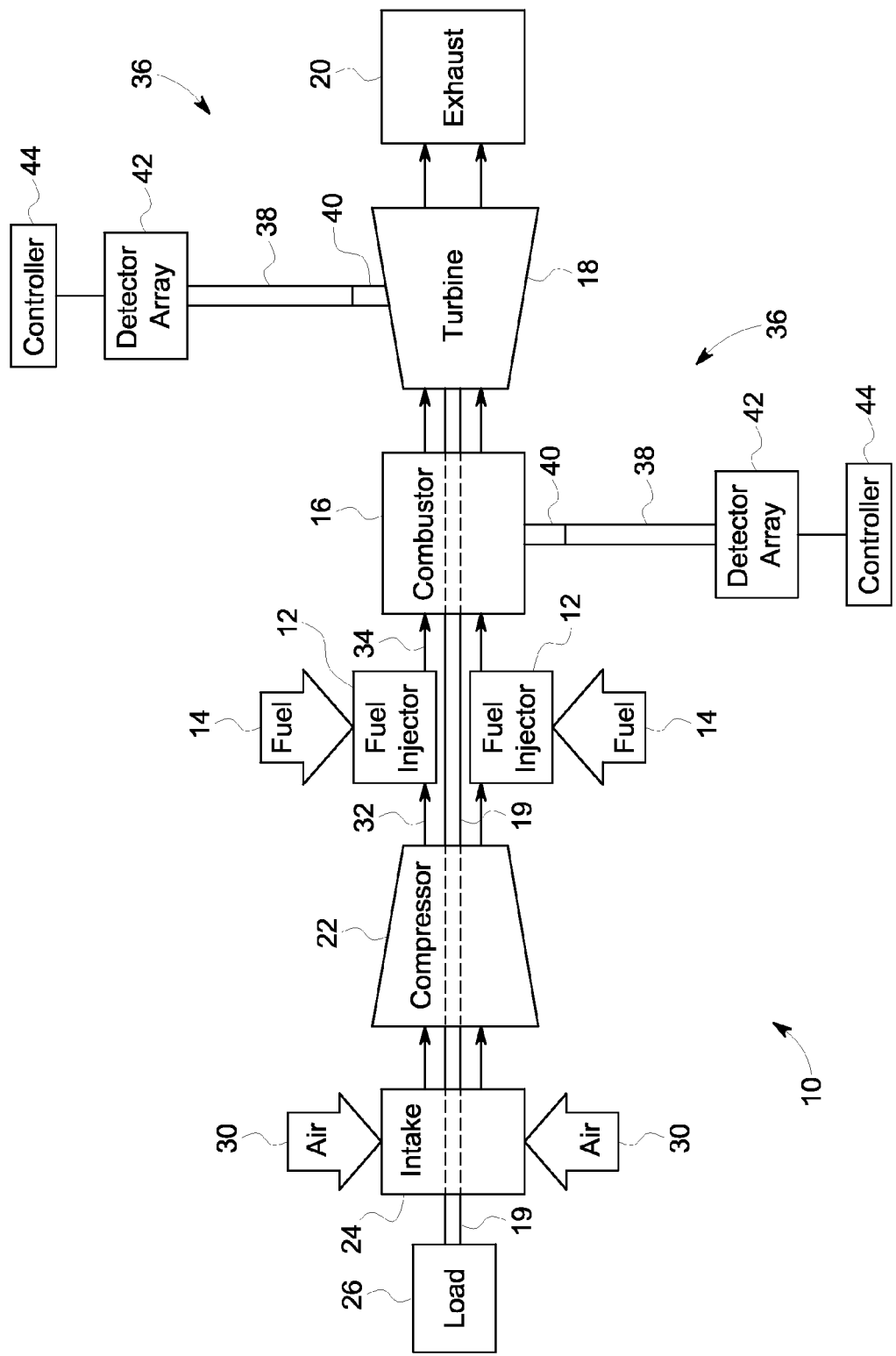
FIG. 1 is a block diagram of an embodiment of a gas turbine system, including an optical monitoring system having an optical connection formed from multiple optical fibers fused to one another to form a unitary substantially rigid fiber bundle.

Embodiments disclosed herein may enhance gas turbine engine operation and maintenance by providing a two-dimensional temperature map of an interior surface of the gas turbine engine while the gas turbine engine is in operation. In certain embodiments, a system for optically monitoring a gas turbine engine includes a viewport having an opening disposed within a casing of the gas turbine engine (e.g., a combustor casing, a turbine casing, etc.). The opening extends from an interior side of the casing to an exterior side of the casing, and the viewport is configured to receive an image from inside the casing. The system also includes an optical connection positioned outside the casing and optically coupled to the viewport. The optical connection is configured to convey the image from the viewport to a detector array, and the optical connection includes multiple optical fibers fused to one another to form a unitary substantially rigid fiber bundle. In certain embodiments, the optical connection includes at least one preformed bend, which may establish clearance between the optical connection and certain components positioned outside the casing. In addition, in certain embodiments, the detector array is configured to output signals indicative of a two-dimensional intensity map of the image. A controller, which is communicatively coupled to the detector array, is configured to generate a two-dimensional temperature map of a monitored surface inside the casing based on the signals. Accordingly, additional information (e.g., thermal stress within the monitored surface) may be determined Turning now to the drawings, FIG. 1 is a block diagram of an embodiment of a turbine system 10, including an optical monitoring system having an optical connection formed from multiple optical fibers fused to one another to form a unitary substantially rigid fiber bundle. The turbine system 10 includes a fuel injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized exhaust gas into a turbine 18. As will be appreciated, the turbine 18 includes one or more stators having fixed vanes or blades, and one or more rotors having blades that rotate relative to the stators. The exhaust gas passes through the turbine rotor blades, thereby driving the turbine rotor to rotate. Coupling between the turbine rotor and a shaft 19 induces rotation of the shaft 19, which is also coupled to several components throughout the gas turbine system 10, as illustrated. Eventually, the exhaust of the combustion process exits the gas turbine system 10 via an exhaust outlet 20.

A compressor 22 includes blades rigidly mounted to a rotor, which is driven to rotate by the shaft 19. As air passes through the rotating blades, air pressure increases, thereby providing the combustor 16 with sufficient air for proper combustion. The compressor 22 intakes air to the gas turbine system 10 via an air intake 24. Further, the shaft 19 may be coupled to a load 26, which is powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As illustrated, the turbine system 10 includes an optical monitoring system 36 optically coupled to the turbine 18. In the illustrated embodiment, the optical monitoring system 36 includes an optical connection 38 extending between a viewport 40 into the turbine 18 and a detector array 42. As discussed in detail below, the viewport 40 includes an opening disposed within a casing of the turbine 18. The opening extends from an interior side of the casing to an exterior side of the casing, and the viewport is configured to receive an image from inside the casing while the gas turbine engine is in operation. The optical connection 38 is positioned outside the casing and optically coupled to the viewport 40. The optical connection 38 is configured to receive the image from the viewport, and the optical connection includes multiple optical fibers fused to one another to form a unitary substantially rigid fiber bundle. The detector array 42, which is in optical communication with the optical connection 38, is configured to receive the image from the optical connection 38 and to output signals indicative of an intensity map (e.g., a one-dimensional intensity map, a two-dimensional intensity map, etc.) of radiant energy within a desired wavelength range. In the illustrated embodiment, the detector array 42 is communicatively coupled to a controller 44, which is configured to receive the signals and to compute a two-dimensional temperature map of each monitored turbine component based on the signals. Because the optical monitoring system 36 generates a two-dimensional temperature map, a temperature gradient across each monitored turbine component may be measured, thereby providing additional information related to component stress, as compared to configurations that only measure a line-of-sight point temperature or an average temperature of each component.

In certain embodiments, the controller 44 is an electronic controller having electrical circuitry configured to process data from the detector array 42. For example, the controller 44 may include processors, storage devices, and memory devices. The processor(s) may be used to execute software, such as image processing software, and so forth. Moreover, the processor(s) may include one or more microprocessors, such as one or more "general-purpose" microprocessors, one or more special-purpose microprocessors, and/or an application specific integrated circuits (ASICS), or some combination thereof. For example, the processor(s) may include one or more reduced instruction set (RISC) processors.

The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., image data, etc.), instructions (e.g., software or firmware for processing images, etc.), and any other suitable data. The memory device(s) may include a volatile memory, such as random access memory (RAM), and/or a nonvolatile memory, such as ROM. The memory device(s) may store a variety of information and may be used for various purposes. For example, the memory device(s) may store processor-executable instructions (e.g., firmware or software) for the processor(s) to execute, such as instructions for an image processing software.

In certain embodiments, the controller 44 may include a communication device (e.g., network interface, wireless communication module, etc.) configured to communicate (e.g., via wired or wireless signals) with a remote server or a cloud-based computer network, for example. In such embodiments, the controller 44 may output signals indicative of the two-dimensional temperature map of each monitored turbine component. The remote server or network may store and/or process the signals to facilitate short-term and/or long-term health monitoring of the turbine components. For example, the remote server or network may compare a first two-dimensional temperature map of a component with a previous two-dimensional temperature map of the component to identify variations in the temperature and/or the temperature gradient.

In the illustrated embodiment, the gas turbine system 10 includes a second optical monitoring system 36 optically coupled to the combustor 16. Similar to the turbine optical monitoring system described above, the combustor optical monitoring system includes an optical connection 38 extending between a viewport 40 into the combustor 16 and a detector array 42. In addition, the optical connection 38 includes multiple optical fibers fused to one another to form a unitary substantially rigid fiber bundle. While the illustrated embodiment employs separate optical monitoring systems 36 to monitor the combustor 16 and the turbine 18, it should be appreciated that, in alternative embodiments, a single optical monitoring system having multiple detector arrays may be employed to monitor the combustor 16 and the turbine 18. In such embodiments, one or more optical connections may extend from the turbine 18 and the combustor 16 to respective detector arrays. In further embodiments, one or more optical monitoring systems may be employed to monitor the compressor 22, the intake 24, the fuel injectors 12, and/or the exhaust 20.

Figure 2:
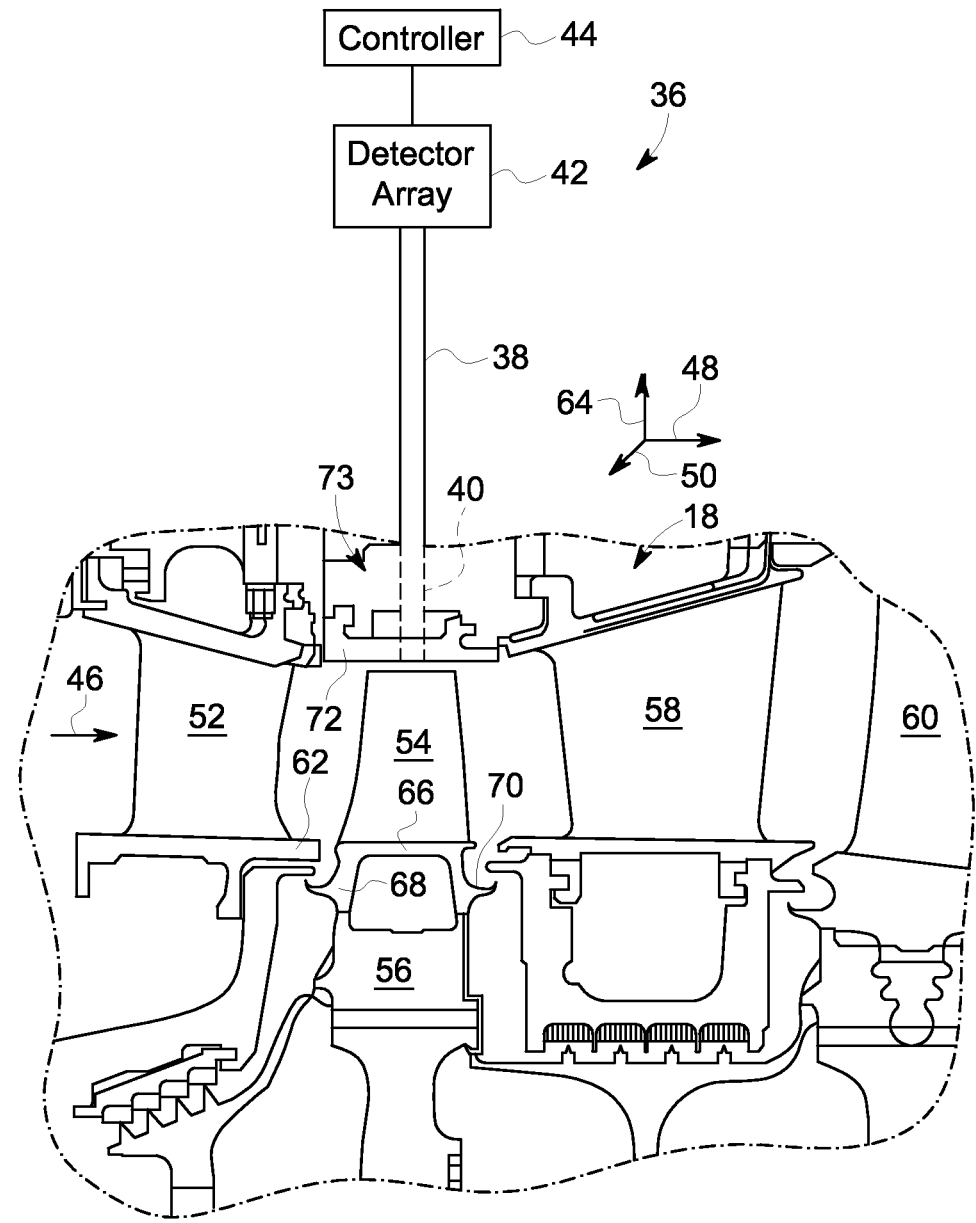
FIG. 2 is a cross-sectional view of an embodiment of a turbine section, including various turbine components that may be monitored by an optical monitoring system.

FIG. 2 is a cross-sectional view of a turbine section, including various turbine components that may be monitored by the optical monitoring system 36. As illustrated, exhaust gas 46 from the combustor 16 flows into the turbine 18 in an axial direction 48 and/or a circumferential direction 50. The illustrated turbine 18 includes at least two stages, with the first two stages shown in FIG. 2. Other turbine configurations may include more or fewer turbine stages. For example, a turbine may include 1, 2, 3, 4, 5, 6, or more turbine stages. The first turbine stage includes vanes 52 and blades 54 substantially equally spaced in the circumferential direction 50 about the turbine 18. The first stage vanes 52 are rigidly mounted to the turbine 18 and configured to direct combustion gas toward the blades 54. The first stage blades 54 are mounted to a rotor 56 that is driven to rotate by the exhaust gas 46 flowing through the blades 54. The rotor 56, in turn, is coupled to the shaft 19, which drives the compressor 22 and the load 26. The exhaust gas 46 then flows through second stage vanes 58 and second stage blades 60. The second stage blades 60 are also coupled to the rotor 56. As the exhaust gas 46 flows through each stage, energy from the gas is converted into rotational energy of the rotor 56. After passing through each turbine stage, the exhaust gas 46 exits the turbine 18 in the axial direction 48.

In the illustrated embodiment, each first stage vane 52 extends outwardly from an endwall 62 in a radial direction 64. The endwall 62 is configured to block hot exhaust gas 46 from entering the rotor 56. A similar endwall may be present adjacent to the second stage vanes 58, and subsequent downstream vanes, if present. Similarly, each first stage blade 54 extends outwardly from a platform 66 in the radial direction 64. As will be appreciated, the platform 66 is part of a shank 68 which couples the blade 54 to the rotor 56. The shank 68 also includes a seal, or angel wing, 70 configured to block hot exhaust gas 46 from entering the rotor 56. Similar platforms and angel wings may be present adjacent to the second stage blades 60, and subsequent downstream blades, if present. Furthermore, a shroud 72 is positioned radially outward from the first stage blades 54. The shroud 72 is configured to reduce the quantity of exhaust gas 46 that bypasses the blades 54. Gas bypass is undesirable because energy from the bypassing gas is not captured by the blades 54 and translated into rotational energy. While the optical monitoring system 36 is described below with reference to monitoring components within the turbine 18 of a gas turbine engine 10, it should be appreciated that the optical monitoring system 36 may be employed to monitor components within other rotating and/or reciprocating machinery, such as a turbine in which steam or another working fluid passes through turbine blades to provide power or thrust.

As will be appreciated, various components within the turbine 18 (e.g., vanes 52 and 58, blades 54 and 60, endwalls 62, platforms 66, angel wings 70, shrouds 72, etc.) are exposed to the hot exhaust gas 46 from the combustor 16. Consequently, it may be desirable to measure a temperature of certain components during operation of the turbine 18 to ensure that the temperature remains within a desired range and/or to monitor thermal stress within the components. For example, the optical monitoring system 36 may be configured to determine a two-dimensional temperature map of the first stage turbine blades 54. As will be appreciated, the two-dimensional temperature map may be utilized to determine a temperature gradient across each blade 54, thereby facilitating computation of thermal stress within the blade 54.

In the illustrated embodiment, an optical connection 38 optically couples a viewport 40 to the detector array 42. As illustrated, the optical connection 38 is configured to convey an image of a circumferential side of the blade 54 to the detector array 42. The viewport 40 may be angled in the axial direction 48, circumferential direction 50, and/or radial direction 64 to direct the viewport 40 toward a desired region of the blade 54. In addition, the viewport 40 may be positioned upstream of the blade 54 to facilitate monitoring an upstream portion of the blade 54, or downstream from the blade 54 to facilitate monitoring a downstream portion of the blade 54. In alternative embodiments, additional viewports 40 and optical connections 38 may be employed to obtain additional images of the first stage blade 54. For example, certain embodiments may employ 1, 2, 3, 4, 5, 6, 7, 8, or more viewports 40 and a corresponding number of optical connections 38 to convey images of the blade 54 to respective detector arrays. As will be appreciated, the more viewports 40 and optical connections 38 employed, the more regions of the blade 54 that may be monitored.

In the illustrated embodiment, the viewport 40 includes an opening disposed within a casing 73 (e.g., including the shroud 72) of the turbine 18. The opening extends from an interior side of the casing to an exterior side of the casing, and the viewport is configured to receive an image from inside the casing (e.g., an image of the circumferential side of the blade 54). The optical connection 38 is positioned outside the casing and optically coupled to the viewport 40. The optical connection 38 is configured to convey the image from the viewport 40 to the detector array 42. In addition, the optical connection 38 includes multiple optical fibers fused to one another to form a unitary substantially rigid fiber bundle. The optical connection 38 may be substantially straight, as illustrated, or the optical connection 38 may include a preformed bend that establishes clearance between the optical connection 38 and another component positioned outside the turbine. As discussed in detail below, the preformed bend may be formed by heating the optical connection 40 and bending the optical connection to a desired angle prior to optically coupling the optical connection to the viewport 40.

While the viewport 40 is directed toward the first stage blades 54 in the illustrated embodiment, it should be appreciated that the viewport 40 may be directed toward other turbine components in alternative embodiments. For example, one or more viewports 40 may be directed toward the first stage vanes 52, the second stage vanes 58, the second stage blades 60, the endwalls 62, the platforms 66, the angel wings 70, the shrouds 72, or other components within the turbine 18. Further embodiments may include viewports 40 directed toward multiple components within the turbine 18. Similar to the first stage blades 54, the optical monitoring system 36 may determine a two-dimensional temperature map for each component within a field of view of a viewport 40. In this manner, thermal stress within various turbine components may be measured, thereby providing an operator with data that may be used to adjust operational parameters of the turbine system 10 and/or to determine maintenance intervals.

The detector array 42 is configured to receive an image from the optical connection 38 and to output signals indicative of an intensity map of radiant energy within a desired wavelength range. The detector array 42 may be configured to capture multiple images over a period of time. As will be appreciated, certain turbine components, such as the first stage blades 54 described above, may rotate at high speed along the circumferential direction 50 of the turbine 18. Consequently, to capture an image of such components, the detector array 42 may be configured to operate at a frequency sufficient to provide the controller 44 with a substantially still image of each component. For example, in certain embodiments, the detector array 42 may be configured to output the signals indicative of the intensity map of each image at a frequency greater than approximately 100, 1000, 10,000, 20,000, 40,000, 60,000, 80,000, or 100,000 Hz, or more. In further embodiments, the detector array 42 may be configured to output the signals indicative of the intensity map of each image with an integration time shorter than approximately 25, 20, 15, 10, 5, 3, 2, 1, or 0.5 microseconds, or less. In this manner, a two-dimensional temperature map may be generated for each rotating turbine component.

Figure 3:
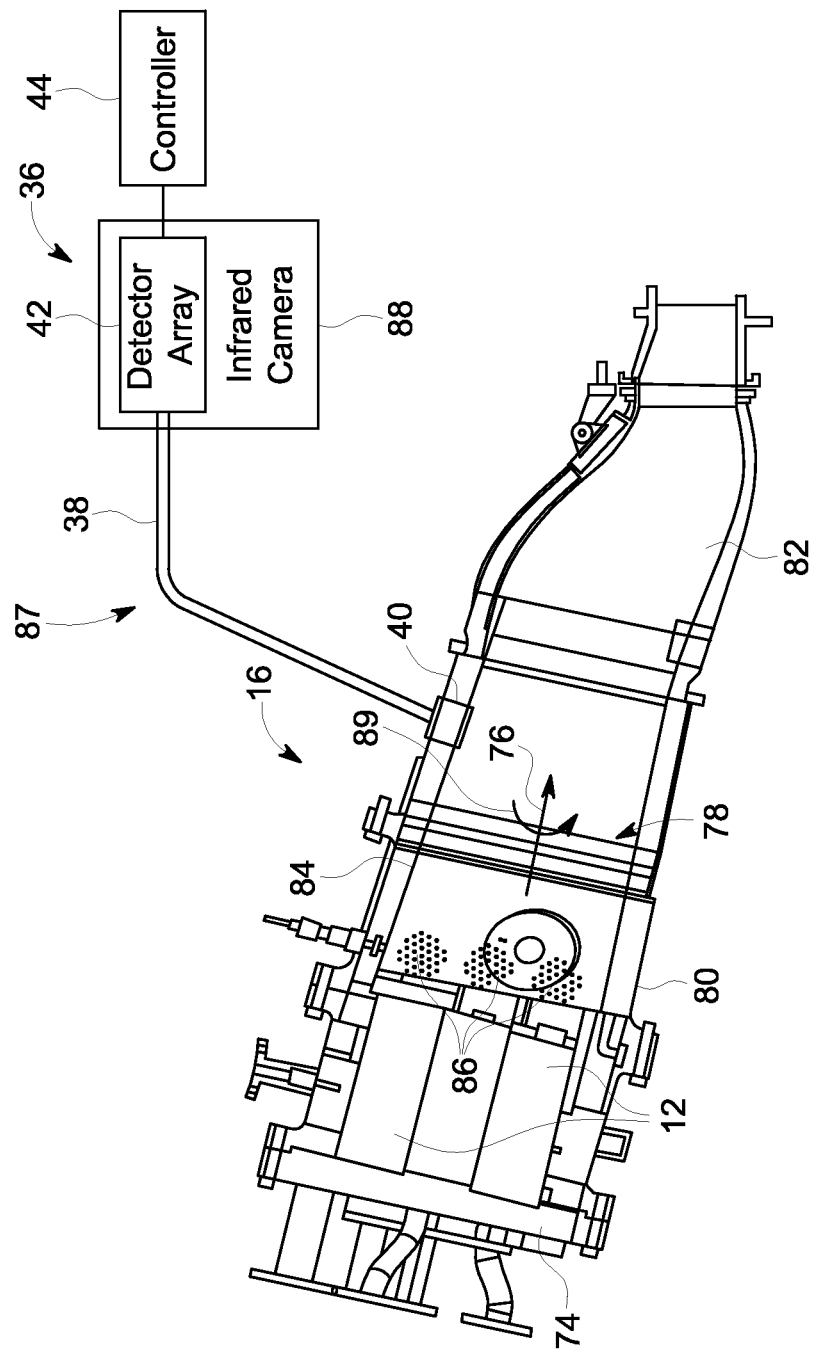
FIG. 3 is a cross-sectional view of an embodiment of a combustor, including various combustor components that may be monitored by an optical monitoring system.

FIG. 3 is a cross-sectional view of an embodiment of a combustor 16, including various combustor components that may be monitored by the optical monitoring system 36. As illustrated, the combustor 16 includes fuel nozzles 12 that are attached to an end cover 74 at a base of the combustor 16. In certain embodiments, the combustor 16 may include five or six fuel nozzles 12. In other embodiments of combustor 16 may include a single large fuel nozzle 12. The surfaces and geometry of the fuel nozzles 12 are particularly configured to enhance mixing of the air and fuel as the fuel-air mixture flows downstream through the combustor 16. The enhanced mixing may increase combustor efficiency, thereby producing more power in the turbine engine. The fuel-air mixture is expelled from the fuel nozzles 12 in a downstream direction 76 to a combustion zone 78 inside a combustor casing 80. The combustion zone 78 is positioned downstream from the fuel nozzles 12 to reduce heat transfer from the hot combustion gas to the fuel nozzles 12. In the illustrated embodiment, the combustion zone 78 is located inside the combustor casing 80, downstream from the fuel nozzles 12 and upstream from a transition piece 82 of the combustor 16. The transition piece 82 directs the pressurized exhaust gas toward the turbine 18, and includes a converging section configured to increase a velocity of the exhaust gas, thereby producing a greater force to drive the turbine 18 in rotation. In the illustrated embodiment, the combustor 16 includes a liner 84 located inside the casing 80 to provide a hollow annular path for a cooling air flow, which cools the casing 80 around the combustion zone 78. The liner 84 may establish a suitable shape to improve flow from the fuel nozzles 12 to the turbine 18.

In the illustrated embodiment, the optical monitoring system 36 includes an optical connection 38 to a viewport 40 into the combustor 16. As discussed in detail below, the viewport 40 includes an opening disposed within the casing 80 and extending from an interior side of the casing to an exterior side of the casing. In addition, the viewport 40 is directed toward a region of interest within the combustor 16. For example, in the illustrated embodiment, the viewport 40 is directed toward the liner 84 on an opposite side of the combustor 16 from flames 86 and exhaust gas. As discussed in detail below, the optical monitoring system 36 may include additional viewports 40 to facilitate monitoring of other interior surfaces and/or components of the combustor, such as an interior surface of the transition piece 82.

As previously discussed, the optical monitoring system 36 includes an optical connection 38 positioned outside the casing 80 and optically coupled to the viewport 40. The optical connection is configured to convey an image of an interior of the combustor 16 to the detector array 42, and the optical connection includes multiple optical fibers fused to one another to form a unitary substantially rigid fiber bundle. As discussed in detail below, the bending stiffness and/or the flexural rigidity of the fiber bundle may be significantly higher than a flexible optical cable. Accordingly, the optical connection 38 may substantially maintain an original shape during operation of the gas turbine engine. In the illustrated embodiments, the optical connection 38 includes a preformed bend 87, which may be particularly configured to establish clearance between the optical connection 38 and another component positioned outside the combustor casing 80. As discussed in detail below, the preformed bend 87 may be formed by heating the optical connection and bending the optical connection to a desired angle prior to optically coupling the optical connection to the viewport 40.

In the illustrated embodiment, the optical monitoring system 36 includes an infrared camera 88 having the detector array 42. The detector array 42 of the turbine optical monitoring system may also be an element of an infrared camera. In certain embodiments, the detector array 42 is configured to detect short-wave infrared images (e.g., having a wavelength range of about 0.9 to about 1.7 microns) and/or mid-wave infrared images (e.g., having a wavelength range of about 3 to about 5 microns). For example, a detector array configured to detect short-wave infrared images may be employed to monitor components within the turbine 18, and a detector array configured to detect mid-wave infrared images may be employed to monitor components within the combustor 16. The detector array 42 is configured to output signals indicative of a two-dimensional intensity map of the detected image to the controller 44. The controller 44, in turn, is configured to generate a two-dimensional temperature map of an interior surface of the combustor based on the signals. Because the optical monitoring system 36 generates a two-dimensional temperature map, a temperature gradient across the monitored surface of the combustor may be measured, as compared to pyrometry systems that only measure a line-of-sight point temperature or an average temperature of the interior combustor surface. Analyzing the temperature gradient of the combustor surface may provide additional information related to surface stress, thereby facilitating determination of a maintenance interval.

While the illustrated embodiment includes a single viewport 40 into the combustor 16, it should be appreciated that alternative embodiments may include additional viewports. For example, in certain embodiments, the combustor 16 may include 2, 4, 6, 8, 10, 12, or more viewports 40. The viewports 40 may be distributed along the length of the combustor 16 in the direction 76 and/or about the circumference of the combustor 16 in the direction 89. Each viewport 40 may be directed toward a region of interest within the combustor 16. For example, viewports 40 located proximate to the fuel nozzles 12 may be directed toward surfaces (e.g., the liner 84, etc.) within the combustion zone 78 proximate to the flames 86, and the viewports 40 located farther downstream may be directed toward the combustor liner 84 and/or the transition piece 82. In this manner, various regions of the combustor 16 may be monitored by the optical monitoring system 36. In addition, by positioning viewports 40 circumferentially around the combustor 16 in the direction 89, the optical monitoring system 36 may monitor different portions of the combustor liner 84 and/or the transition piece 82. Furthermore, while the optical monitoring system 36 is configured to monitor a single combustor in the illustrated embodiment, it should be appreciated that, in alternative embodiments, the optical monitoring system 36 may be configured to monitor multiple combustors.

Figure 4:
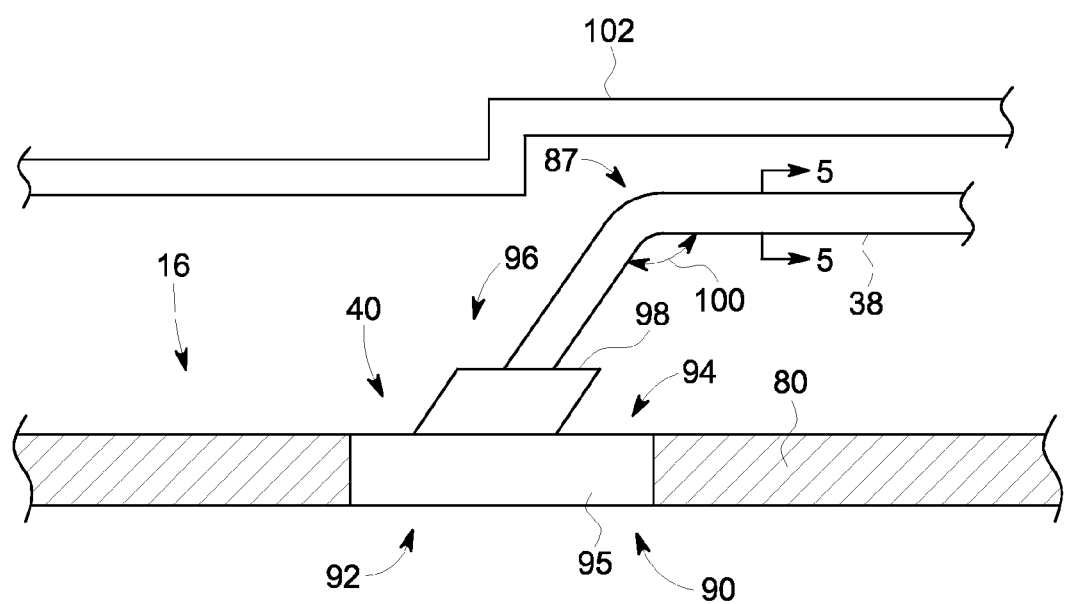
FIG. 4 is a schematic view of an embodiment of an optical monitoring system having an optical connection formed from multiple optical fibers fused to one another to form a unitary substantially rigid fiber bundle.

FIG. 4 is a schematic view of an embodiment of an optical monitoring system 36 having an optical connection 38 formed from multiple optical fibers fused to one another to form a unitary substantially rigid fiber bundle. In the illustrated embodiment, the viewport 40 includes an opening 90 disposed within the combustor casing 80. As illustrated, the opening 90 extends from an interior side 92 of the casing 80 to an exterior side 94 of the casing 80. In the illustrated embodiment, a window 95 is disposed within the opening 90. The window 95 is formed from a heat resistant transparent material, such as fused quartz or synthetic sapphire, among others. As will be appreciated, the window material may be particularly selected to be substantially transparent to the monitored wavelengths (e.g., short-wave infrared, mid-wave infrared, etc.). In alternative embodiments, the window 95 may be omitted, and an optical tube, which is optically coupled to the optical connection 38, may be inserted into the opening 90. The optical tube may include one or more lenses configured to focus an image from inside the combustor onto the optical connection 38. While the illustrated opening is disposed within the combustor casing 80, it should be appreciated that the opening may be disposed within the turbine casing, or a casing of another element of the gas turbine system 10, in alternative embodiments.

As illustrated, the optical connection 38 is positioned within a region 96 outside the casing 80, i.e., outward from the exterior side 94 of the opening 90. Accordingly, the optical connection 38 is substantially insulated from the flames and the hot exhaust gas inside the combustor casing 80, thereby enabling the optical monitoring system to monitor the combustor 16 while the gas turbine engine is in operation. In the illustrated embodiment, a lens assembly 98 is coupled to the optical connection 38 and configured to focus radiation emitted by a combustor component and/or by the flames/ exhaust gas onto the optical connection 38. As will be appreciated, the lens assembly 98 may include a lens, or series of lenses, configured to establish a field of view covering at least a portion of the combustor component, or other desired surface of the combustor 16. By selecting an appropriate lens assembly 98, a desired field of view may be established, thereby enabling the optical monitoring system 36 to capture a two-dimensional image of the combustor component.

As previously discussed, the optical connection 38 includes multiple optical fibers fused to one another to form a unitary substantially rigid fiber bundle. The fiber bundle is configured to convey an image from the viewport to the detector array, which is also positioned outside the casing 80. For example, during operation of the gas turbine engine, the viewport 40 receives an image from inside the casing (e.g., an image of a combustor component, an image of a turbine component, etc.). The optical connection 38 conveys the image from the viewport 40 to the detector array 42, thereby enabling the detector array 42 to monitor a component inside the casing. Because the optical connection 38 enables the detector array 42 to be positioned remote from the combustor, a cooling assembly, which may be employed to reduce the temperature of detector arrays positioned proximate to the combustor, may be obviated. As a result, costs associated with monitoring a gas turbine engine may be substantially reduced.

In the illustrated embodiment, the optical connection includes a preformed bend 87. The preformed bend 87 may be formed by heating the optical connection and bending the optical connection to a desired angle 100. For example, heat may be applied to a desired region of the optical connection, thereby enabling the substantially rigid fiber bundle to bend in response to application of force (e.g., a bending load). As the optical connection cools, a substantially rigid fiber bundle having a desired bend is formed. As will be appreciated, additional bends (e.g., 1, 2, 3, 4, 5, 6, 7, 8, or more) may be formed by repeating the bending process. The shape of the optical connection may be particularly selected to maintain clearance between the optical connection and certain components positioned outside the combustor 16. For example, in the illustrated embodiment, a conduit 102 is positioned proximate to the combustor 16. Accordingly, the angle 100 of the bend 87 is particularly selected to maintain a desired clearance between the conduit 102 and the optical connection 38.

In addition, a radius of curvature of the bend 87 may be significantly less than a minimum radius of curvature of a flexible optical cable. As will be appreciated, the radius of curvature of a flexible optical cable may be limited by the structural properties of the constituent optical fibers and/or a thickness of the cable. Because the optical connection 38 includes a substantially rigid fiber bundle that may be bent to a desired angle by a heating/bending process, the radius of curvature of the bend is not substantially limited by the structural properties of the constituent optical fibers or the thickness of the fiber bundle. Accordingly, for a desired number of optical fibers, the radius of curvature of the bend 87 in the optical connection 38 may be 1.5, 2, 3, 4, 5, or more times less than a minimum radius of curvature of a flexible optical cable. As a result, the optical connection 38 may be positioned in locations that are otherwise inaccessible by a flexible optical cable.

As previously discussed, the optical fibers of the optical connection 38 are fused to one another to form a unitary substantially rigid fiber bundle. Accordingly, the bending stiffness and/or the flexural rigidity of the fiber bundle may be significantly higher than a flexible optical cable (e.g., formed from multiple independent optical fibers). As will be appreciated, bending stiffness and/or flexural rigidity of an object may be at least partially dependent on an area moment of inertia of the object and an elastic modulus, such as Young's modulus, of the material that forms the object. As will be appreciated, objects having a larger area moment of inertia are more resistant to bending than objects having a smaller area moment of inertia. In certain embodiments, the rigid fiber bundle may have an area moment of inertia 2, 5, 10, 20, 100, or more times greater than the area moment of inertia of a flexible optical cable. Accordingly, the bending stiffness and/or the flexural rigidity of the rigid fiber bundle may be 1, 5, 10, 20, 100, or more times greater than the bending stiffness and/or the flexural rigidity of a flexible optical cable. As a result, in contrast to flexible optical cables, the fiber bundle may substantially maintain a desired shape during operation of the gas turbine engine.

Figure 5:
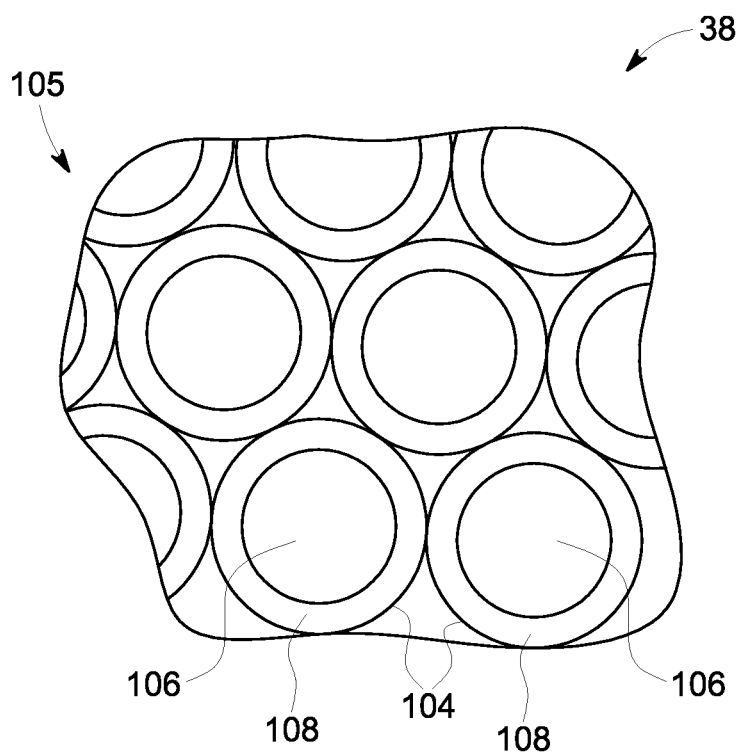
FIG. 5 is a partial cross-sectional view of the optical connection of FIG. 4, taken along line 5-5.

FIG. 5 is a partial cross-sectional view of the optical connection 38 of FIG. 4, taken along line 5-5. In the illustrated embodiment, the optical connection 38 includes multiple optical fibers 104 fused to one another to form a unitary substantially rigid fiber bundle 105. As illustrated, each optical fiber 104 includes a core 106 and a cladding 108 disposed about the core 106. The claddings 106 are fused to one another to form the unitary fiber bundle 105. For example, each optical fiber 104 may be heated to at least partially soften the cladding 106. Application of pressure during or after the heating process induces the optical fibers 104 to fuse to one another as the claddings 106 cool and solidify. In certain embodiments, at least a substantial portion of the optical fibers 104 within the fiber bundle 105 are fused to one another to establish a substantially rigid fiber bundle 105.

In certain embodiments, a first refractive index of each core 106 is greater than a second refractive index of each cladding 108. Accordingly, electromagnetic radiation passing through the core 106 is subject to total internal reflection, thereby facilitating passage of the electromagnetic radiation through the core 106. Furthermore, the optical fibers 104 are substantially aligned with one another to establish a coherent fiber bundle. The coherent fiber bundle establishes a substantially accurate mapping of a first image received by a first end of the fiber bundle (e.g., from the viewport 40) to a second image projected by a second end of the fiber bundle (e.g., toward the detector array). Accordingly, the detector array 42 may receive a substantially accurate intensity map of radiant energy within a desired wavelength range. In addition, the fused fiber bundle 105 may have a core-to-cladding ratio (e.g., by cross-sectional area) greater than about 50 percent, about 60 percent, about 70 percent, about 80 percent, or more. For example, the core-to-cladding ratio may be about 50 percent to about 90 percent, about 65 percent to about 85 percent, or about 75 percent to about 85 percent. As will be appreciated, a higher core-to-cladding ratio may facilitate greater electromagnetic radiation transmission through the fiber bundle and/or enable a higher resolution image to be transmitted through a fiber bundle of a selected diameter.

The core material may be particularly selected to be substantially transparent to the monitored wavelengths (e.g., short-wave infrared, mid-wave infrared, etc.). For example, the core may be formed from doped silica (e.g., doped with germanium dioxide, aluminum oxide, etc.) to facilitate transmission of electromagnetic radiation within a desired wavelength range. Furthermore, the unitary substantially rigid fiber bundle 105 may include more than about 5,000, about 100,000, about 500,000, about 1,000,000, about 2,000,000, about 5,000,000, or more optical fibers 104. By way of example, the fiber bundle 105 may include about 5,000 to about 5,000,000 optical fibers, about 10,000 to about 1,000,000 optical fiber, or about 50,000 to about 200,000 optical fibers. In certain embodiments, the optical connection 38 may include a protective sheath disposed about the unitary substantially rigid fiber bundle 105 to shield the fiber bundle from external contamination.

In certain embodiments, the number of optical fibers may be selected to substantially correspond to the number of detection elements within the detector array. For example, each optical fiber 104 may convey electromagnetic radiation from a region of a gas turbine component to a corresponding detection element of the detector array. Accordingly, increasing the number of optical fibers 104 within the fiber bundle 105 may establish a corresponding increase in the resolution of the detected intensity map. In further embodiments, multiple optical fibers may be optically coupled to each detection element. In such embodiments, the number of optical fibers may be selected to substantially correspond to the number of detection elements multiplied by the desired number of fibers per detection element. For example, in certain embodiments, 1, 2, 4, 6, 8, 10, or more optical fibers may convey electromagnetic radiation from a region of a gas turbine component to each detection element of the detector array. In further embodiments, each optical fiber 104 may convey electromagnetic radiation to multiple detection elements of the detector array. For example, in certain embodiments, each optical fiber 104 may convey electromagnetic radiation to 1, 2, 4, 6, 8, 10, or more detection elements.

Figure 6:
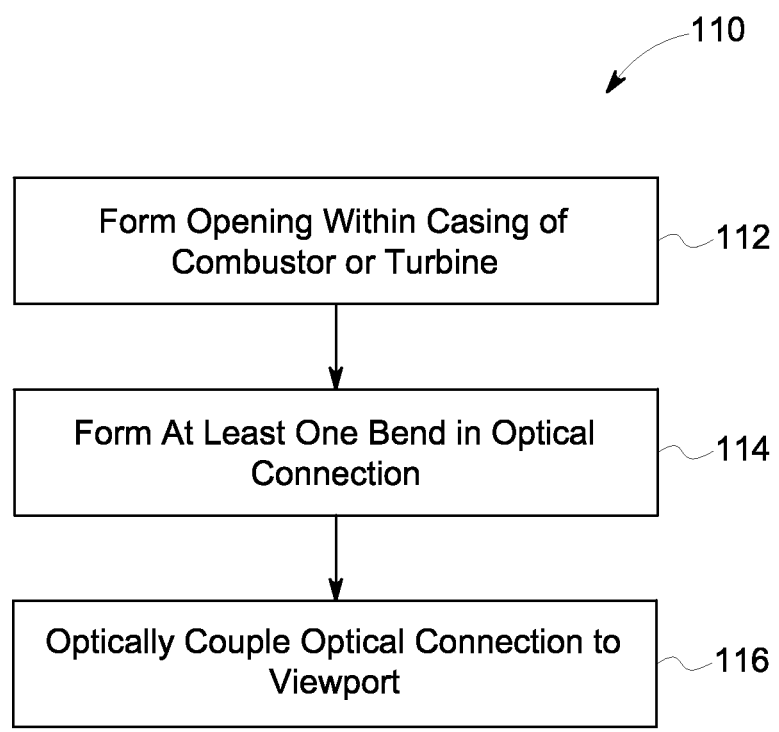
FIG. 6 is a flow diagram of an embodiment of a method of manufacturing an optical monitoring system for a gas turbine engine.

FIG. 6 is a flow diagram of an embodiment of a method 110 of manufacturing an optical monitoring system for a gas turbine engine. First, as represented by block 112, an opening of a viewport is formed within a casing of a combustor or a turbine. As previously discussed, the opening extends from an interior side of the casing to an exterior side of the casing. In addition, the viewport is configured to receive an image from inside the casing. In certain embodiments, at least one bend is formed within an optical connection, as represented by block 114. As previously discussed, the optical connection includes multiple optical fibers fused to one another to form a unitary substantially rigid fiber bundle. Applying heat to a desired region of the optical connection enables the substantially rigid fiber bundle to bend in response to application of force (e.g., a bending load). As the optical connection cools, a substantially rigid fiber bundle having a desired bend is formed. As will be appreciated, additional bends (e.g., 1, 2, 3, 4, 5, 6, 7, 8, or more) may be formed by repeating the bending process, thereby forming the optical connection into a desired shape, such as a shape that maintains a desired clearance from certain components positioned outside the casing. Finally, as represented by block 116, the optical connection is optically coupled to the viewport. As previously discussed, the optical connection is positioned outside the casing and configured to convey the image from the viewport to a detector array. Furthermore, the optical connection includes multiple optical fibers fused to one another to form a unitary substantially rigid fiber bundle. Accordingly, the optical connection substantially maintains a desired shape during operation of the gas turbine engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for optically monitoring a gas turbine engine, comprising:
   a viewport having an opening disposed within a casing of the gas turbine engine, wherein the opening extends from an interior side of the casing to an exterior side of the casing, and the viewport is configured to receive an image from inside the casing; and
   an optical connection positioned outside the casing and optically coupled to the viewport, wherein the optical connection is configured to convey the image from the viewport to a detector array, and the optical connection comprises a plurality of optical fibers fused to one another to form a unitary substantially rigid fiber bundle.

2. The system of claim 1, wherein a first bending stiffness, a first flexural rigidity, or a combination thereof, of the substantially rigid fiber bundle is at least five times greater than a second bending stiffness, a second flexural rigidity, or a combination thereof, of a flexible optical cable.

3. The system of claim 1, wherein each optical fiber comprises a core and a cladding disposed about the core, and a first refractive index of each core is greater than a second refractive index of each cladding.

4. The system of claim 1, wherein optical fibers of the plurality of optical fibers are substantially aligned with one another to establish a coherent fiber bundle.

5. The system of claim 1, wherein the optical connection comprises at least one preformed bend.

6. The system of claim 5, wherein the at least one preformed bend is formed by heating the optical connection and bending the optical connection to a desired angle prior to optically coupling the optical connection to the viewport.

7. The system of claim 1, wherein the casing comprises a combustor casing or a turbine casing.

8. The system of claim 1, wherein the system is configured to monitor the gas turbine engine while the gas turbine engine is in operation.

9. The system of claim 1, comprising an infrared camera having the detector array, wherein the detector array is configured to detect short-wave infrared images, mid-wave infrared images, or a combination thereof.

10. A system for optically monitoring a gas turbine engine, comprising:
a viewport having an opening disposed within a casing of the gas turbine engine, wherein the opening extends from an interior side of the casing to an exterior side of the casing, and the viewport is configured to receive an image from inside the casing while the gas turbine engine is in operation;
an optical connection positioned outside the casing and optically coupled to the viewport, wherein the optical connection is configured to receive the image from the viewport, and the optical connection comprises a plurality of optical fibers fused to one another to form a unitary substantially rigid fiber bundle; and
a detector array in optical communication with the optical connection, wherein the detector array is configured to receive the image from the optical connection and to output signals indicative of a two-dimensional intensity map of the image.

11. The system of claim 10, comprising a controller communicatively coupled to the detector array, wherein the controller is configured to generate a two-dimensional temperature map of a surface inside the casing based on the signals.

12. The system of claim 10, comprising an infrared camera having the detector array, wherein the detector array is configured to detect short-wave infrared images, mid-wave infrared images, or a combination thereof.

13. The system of claim 10, wherein two or more optical fibers of the plurality of optical fibers are configured to optically couple to a detection element of the detector array.

14. The system of claim 10, wherein the optical connection comprises at least one preformed bend.

15. The system of claim 10, wherein the casing comprises a combustor casing or a turbine casing.

16. A method of manufacturing an optical monitoring system for a gas turbine engine, comprising:
optically coupling an optical connection to a viewport having an opening disposed within a casing of the gas turbine engine, wherein the opening extends from an interior side of the casing to an exterior side of the casing, the viewport is configured to receive an image from inside the casing, the optical connection is positioned outside the casing, the optical connection is configured to convey the image from the viewport to a detector array, and the optical connection comprises a plurality of optical fibers fused to one another to form a unitary substantially rigid fiber bundle.

17. The method of claim 16, comprising forming at least one bend in the optical connection prior to optically coupling the optical connection to the viewport.

18. The method of claim 17, wherein forming the at least one bend comprises heating the optical connection and applying a force to the optical connection to bend the optical connection to a desired angle.

19. The method of claim 16, wherein each optical fiber is configured to optically couple to a plurality of detection elements of the detector array.

20. The method of claim 16, comprising forming the opening within the casing of a combustor, or forming the opening within the casing of a turbine.

* * * * *